Figure 1:
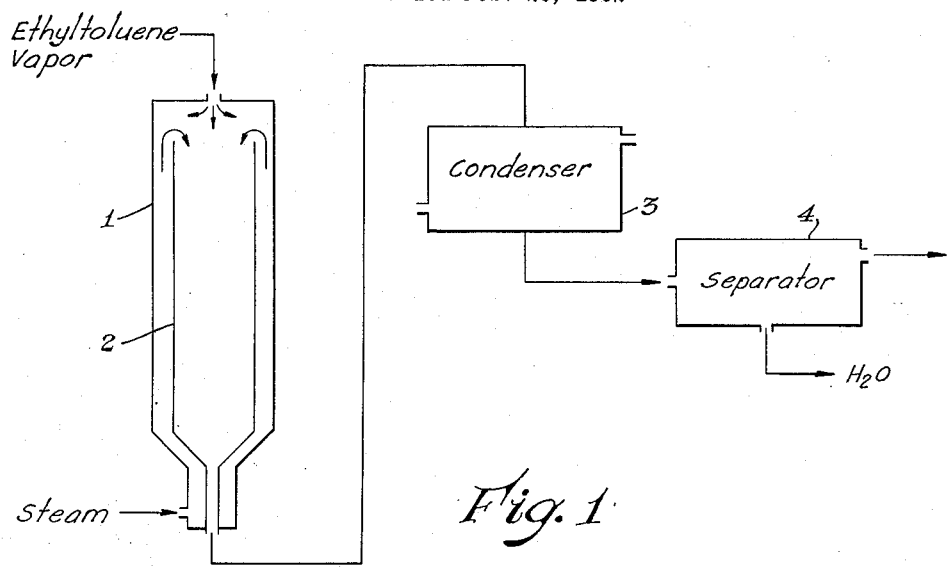

July 6, 1954  J. L. AMOS ET AL  2,683,180
METHOD FOR PRODUCTION OF AR-METHYLSTYRENE
Filed Feb. 28, 1952

INVENTORS
James L. Amos
Frederick J. Soderquist

BY *Griswold & Burdick*
ATTORNEYS

Patented July 6, 1954

2,683,180

UNITED STATES PATENT OFFICE 2,683,180

METHOD FOR PRODUCTION OF ar-METHYLSTYRENE

James L. Amos, Midland, and Frederick J. Soderquist, Essexville, Mich., assignors to The Dow Chemical Company, Midland, Mich., a corporation of Delaware Application February 28, 1952, Serial No. 273,913

5 Claims. (Cl. 260—669)

This invention concerns an improved method of thermally dehydrogenating ar-monoethyltoluenes to produce ar-methylstyrenes.

In the manufacture of styrene, vaporized ethylbenzene is passed into admixture with several times its weight of steam which has been superheated sufficiently to bring the mixture to a reaction temperature, e. g. of from 650° to 800° C., and the mixture is quickly cooled to condense the aromatic products which are separated by distillation. The reaction is usually carried out in the presence of a granular dehydrogenation catalyst, e. g. by passing the vapor mixture through a bed of catalyst, but a catalyst is not required. According to U. S. Patent No. 2,110,829, the superheated steam serves to heat the ethylbenzene vapor almost instantaneously to the reaction temperature, thus causing an extremely rapid dehydrogenation reaction and permitting quick cooling of the vapor mixture before carbonization or tar formation occur to an appreciable extent. The patent teaches that the method may be applied in dehydrogenating other alkylbenzene compounds to form homologues and analogues of styrene.

We have applied this known method in dehydrogenating ar-monoethyltoluenes and have observed that the yield of ar-methylstyrenes from the ar-ethyltoluenes is lower than the yield of styrene obtained by the dehydrogenation of ethylbenzene under otherwise similar reaction conditions. This proved to be the case both when using a mixture of m- and p-ethyltoluenes and when using a mixture of all three of the isomeric monoethyltoluenes as starting materials in the process. However, o-ethyltoluene was found to be more resistant to dehydrogenation and has a greater tendency toward by-product formation than its isomers; hence the yield of ar-methylstyrenes was lower when using a mixture of all three of the isomeric ar-ethyltoluenes in the process than when using the mixture of m- and p-ethyltoluenes as a starting material.

We subsequently found that there is a limited range of temperatures at which the ar-ethyltoluenes may be dehydrogenated in admixture with steam to obtain a satisfactory rate of reaction and a high yield of methylstyrenes, based on the consumed ar-ethyltoluenes, but that this range is much narrower than the range of reaction temperatures which are satisfactory for the dehydrogenation of ethylbenzene to form styrene. In other words, there is a sharp increase in by-product formation and a decrease in yield of ar-methylstyrenes as the reaction temperature employed in the dehydrogenation of ar-ethyltoluenes is raised, and there is a pronounced decrease in rate of reaction, i. e. in per cent conversion per pass through a reaction zone, as the reaction temperture is lowered. As a consequence, there is only a limited range of temperatures, e. g. a range of about 15 degrees centigrade, at which the dehydrogenation of ar-ethyltoluenes may be carried out to obtain a satisfactory conversion and an optimum yield of ar-methylstyrenes. The location of this temperature range varies somewhat, e. g. between limits of 550° and 675° C., depending in part upon whether a dehydrogenation catalyst is used and upon the identity of the catalyst, if employed.

Because of the narrowness of the range of temperatures which are satisfactory for the dehydrogenation of ar-ethyltoluenes to form ar-methylstyrenes and because the reaction is highly endothermic and results in a sharp temperature drop, the aforementioned usual method for the manufacture of styrene (i. e. by admixing one part by weight of vaporized ethylbenzene with several parts of steam superheated sufficiently to bring the mixture to a reaction temperature) cannot be applied in dehydrogenating ar-ethyltoluenes to obtain an optimum yield of ar-methylstyrenes. When the superheated steam and ar-ethyltoluene vapors are admixed to form a mixture having a temperature not greater than is required for rapid reaction, the temperature drops at the start of the reaction and the conversion per pass is low. However, when the mixture is formed at a temperature sufficient to cause extensive reaction, by-products are formed in excessive amount at the expense of the desired ar-methylstyrene product.

On a basis of the foregoing discoveries and observations, we have devised the following method for dehydrogenating ar-ethyltoluenes to obtain a satisfactory conversion per pass and produce ar-methylstyrenes in good yield.

As the ar-ethyltoluene starting material for use in the process of the invention, there is preferably employed a mixture of m- and p-ethyltoluenes, but either of these isomers can be used alone. There can also be used a mixture of the three isomeric ar-ethyltoluenes such as is obtained by a Friedel-Crafts reaction between ethylene and toluene, but the reacted mixture then contains objectionable impurities, e. g. indene and indane, which interfere with purification of the ar-methylstyrene product.

The method of the invention involves passing a stream of vaporized ar-ethyltoluene, preferably a mixture of m- and p-ethyltoluenes, and steam which has been superheated to a temperature above the desired reaction temperature, and usually to above 600° C., into admixture with one another to form a vapor mixture which is at approximately the desired reaction temperature and which contains 1 or more, e. g. from 1:1 to 10:1 and preferably from 2:1 to 5:1, parts by weight of steam per part of the ar-ethyltoluene. The freshly formed mixture is passed through a reaction chamber while externally heating the chamber to replace heat consumed in the reaction and maintain the mixture at a nearly constant reaction temperature. Vapors flowing from the dehydrogenation chamber are cooled to condense the aromatic products and the latter are separated in usual ways, e. g. by fractional distillation under vacuum and in the presence of a polymerization inhibitor.

In practice of the method, as just described, the dehydrogenation chamber is externally heated throughout a major part, and preferably all, of its length. The heating may be accomplished in conventional ways, e. g. by electrical heating units surrounding the chamber, or by passing heating fluids over outer surfaces of the chamber, etc. In a preferred embodiment of the invention, steam which has been superheated to above the desired reaction temperature is passed through a jacket surrounding the reaction chamber, and then into admixture with the vaporized ar-ethyltoluene to form a mixture having a temperature corresponding approximately to the desired reaction temperature, and the mixture is passed through the reaction chamber. In another embodiment, ar-ethyltoluene vapors and steam are admixed to form a mixture having approximately the desired reaction temperature and the mixture is passed through the reaction chamber while externally heating the latter by passing hot combustion gases through a jacket surrounding the chamber. The accompanying drawing, which will hereinafter be explained in greater detail, is a schematic illustration of arrangements of apparatus suitable for practicing these embodiments of the invention.

The dehydrogenation reaction may be carried out in the presence or absence of catalysts, but is preferably accomplished in contact with a solid dehydrogenation catalyst which is present, e. g. as a granular bed or in fluidized form, in the reaction chamber. A catalyst has an effect of increasing the rate of the dehydrogenation reaction at a given temperature and of lowering the temperature required for a rapid reaction. Any of the dehydrogenation catalysts that are suitable for the dehydrogenation of ethylbenzene to form styrene may be used in the process of the invention, and those which are self-regenerative, i. e. which do not accumulate carbon when employed in the presence of steam, are preferred. A considerable number and variety of suitable catalysts, including self-regenerative catalysts, are known in the art. Specific examples of suitable catalysts are: bauxite, activated alumina, and self-regenerative catalysts, consisting essentially of magnesium oxide, ferric oxide, and potassium oxide together usually with lesser amounts of other ingredients such as aluminum oxide and copper oxide.

The optimum temperature for the reaction varies with changes in any of several operating conditions, e. g. whether a catalyst is employed, the identity of the catalyst if used, the proportion of steam present in the reaction mixture, and the rate of flow of the reaction mixture through the reaction zone. However, the optimum temperature is readily determined in any instance. When using suitable reaction temperatures, the conversion, i. e. consumption of ar-ethyltoluene per pass through the reaction chamber, is at least 20 per cent of the ar-ethyltoluene fed to the reaction and the yield of ar-methylstyrene is at least 75 per cent of theoretical, based on the amount of ar-ethyltoluene consumed. Accordingly, for any combination of the above-mentioned reaction conditions other than temperature, the optimum reaction temperature may be determined by raising or lowering the reaction temperature until a point is reached at which the ar-methylstyrene is being formed in maximum yield while at the same time obtaining a conversion value of at least 20 per cent. The range of satisfactory reaction temperatures encompasses the optimum temperature and extends to about 7.5° C. above and below the optimum temperature, i. e. the breadth of the range of satisfactory reaction temperatures is about 15° C. It will be evident that the values, for the satisfactory temperature range, shift with change in the optimum reaction temperature. However, the extent of the range of satisfactory reaction temperatures remains about the same and, in all instances, is within limits of 550° and 675° C.

It may be mentioned that the contact time, i. e. the time of passage of an infinitesimal portion of the reaction vapors through the heated reaction chamber, is not highly critical, but does not exceed 5 minutes and usually is from 0.1 second or less to one minute. In general, the optimum temperature becomes lower with increase in the contact time, and vice versa.

Figure 2:
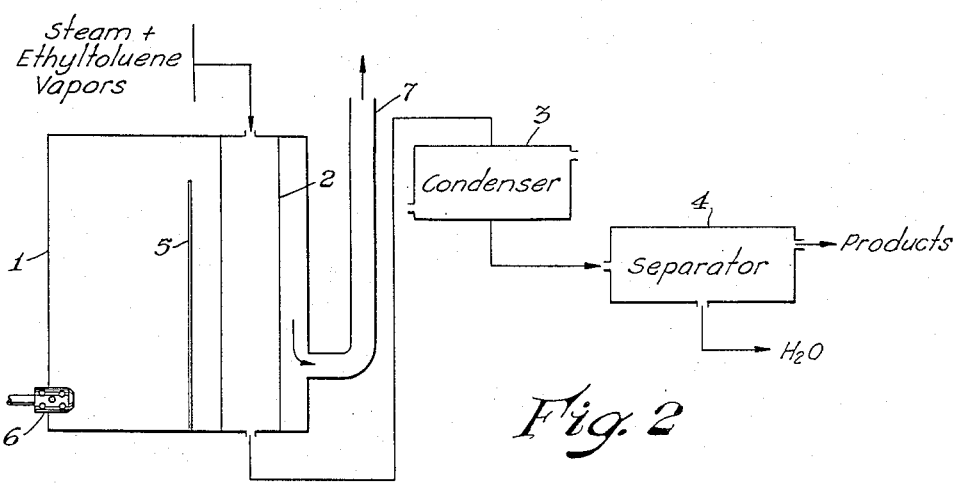

Figs. 1 and 2 of the drawing are diagrammatic sketches illustrating two of the various arrangements of apparatus which may be used in practice of the invention and indicating the flow of materials therethrough. In the arrangement shown in Fig. 1, steam, which has been superheated to above the desired reaction temperature, is fed to a vessel 1 through an inlet near the bottom of the vessel, and vaporized ar-ethyltoluene is, at the same time, fed into an upper section of the vessel. The steam flows upward through an annular space between the walls of the vessel and the walls of an open reaction chamber 2. The steam and ar-ethyltoluene vapors become admixed in a zone above chamber 2 and flow downward through the chamber. The rates of feed of the steam and ar-ethyltoluene vapor are controlled so as to maintain the mixture inside chamber 2 at the desired reaction temperature. The effluent vapors are passed to a condenser 3 where they are cooled to condense the aromatic products and steam. The condensate flows to a continuous separator 4, where the aqueous and organic layers thereof are separated. The organic layer is passed to a still, not shown in the drawing.

In employing the apparatus arrangement of Fig. 2, a freshly formed mixture of steam and ar-ethyltoluene vapors, which mixture is formed at the desired reaction temperature, is passed through a reaction chamber 2 that extends through one section of a vessel 1. A vertical wall, 5, having an opening above the same, divides vessel 1 into two sections. A gas burner 6, which is situated in one of the sections, provides hot combustion gases that flow over the wall 5 and downward within the other section through which the reaction chamber 2 extends. The downward flowing combustion gases serve to heat the chamber 2 and to maintain the reaction vapors therein at an approximately constant temperature. The combustion gases flow from a lower section of vessel 2 to a stack 7. The effluent reaction vapors flow to a condenser 3, where they are cooled to condense steam and the aromatic products, and the condensate flows to a continuous separator 4 where the aqueous and organic layers of the condensate are separated.

The following examples describe ways in which the invention has been practiced and illustrate certain of its advantages, but are not to be construed as limiting its scope.

*Example 1*

The invention was tested using an arrangement of apparatus similar to that illustrated in Fig. 1 of the drawing. Steam which had been superheated to a temperature between 750° and 800° C. was fed at a rate of 125 pounds per hour to the lower section of vessel 1. In flowing through the annular space between the wall of vessel 1 and that of the inner reaction chamber 2, the steam temperature decreased to about 625° C. A vapor mixture of m- and p-ethyltoluenes, which was preheated to a temperature between 450° and 500° C., was fed, at a rate of 41 pounds per hour, into the upper section of vessel 1 where it became admixed with the steam to form a vapor mixture having a temperature of about 575° C. The mixture flowed downward through a bed of a granular dehydrogenation catalyst of the self-regenerative type, which catalyst contained about 30 per cent by weight of ferric oxide, 30 per cent of zinc oxide and 16 per cent of sodium dichromate together with a binder and minor amounts of other ingredients and was present as a bed in chamber 2. The effluent vapors flowed to a cooling unit 3, where the steam and aromatic products were condensed. During passage through the reaction chamber 2, the vapors were maintained at a nearly constant temperature of 575° C., i. e. the temperature of the reaction vapors did not vary by more than 5° C. for the top to the bottom of the chamber. Permanently gaseous products, e. g. hydrogen, ethylene, etc., which remained after condensing the aromatic products were vented from the system. The aqueous and organic layers of the condensate were separated, e. g. in separator 4. Operation in this manner was continued for 775 hours. Throughout this period, samples of the oil layer of product which was being collected were withdrawn from time to time and analyzed. The samples contained from 56 to 60.3 per cent by weight of unreacted ar-ethyltoluenes and a total of from 36.4 to 39.8 per cent of m- and p-methylstyrenes. The average analysis of the reacted mixture for the entire period of operation was 57.5 per cent of unreacted ar-ethyltoluenes and 38.5 per cent of ar-methylstyrenes. The yield of the ar-methylstyrenes was 38.0 per cent of theoretical, based on the amount of ar-ethyltoluenes fed to the reaction, and 86.5 per cent of theoretical, based on the ar-ethyltoluenes consumed.

In a comparative test, steam superheated to 750°–800° C. and a vaporized mixture of m- and p-ethyltoluenes preheated to 450°–500° C. were passed into admixture with one another at rates of 125 pounds per hour and 41 pounds per hour, respectively. The ar-ethyltoluene feed mixture was of the same composition as that employed in the above-described experiment. The mixture of steam and ar-ethyltoluenes, when formed, had a temperature of about 630° C. It was passed directly through a reaction chamber of the same size and shape, and containing the same kind and amount of catalyst, as in the preceding experiment. However, the reaction chamber was not externally heated. The mixture, as it flowed from the reaction chamber, was at a temperature of about 580° C., i. e. there was an approximately 50° C. decrease in temperature of the mixture during travel through the reaction chamber. The effluent vapors were cooled to condense the aromatic products and steam, and the aqueous and organic layers of condensate were separated, as in the preceding experiment. The process was operated, as just described, for approximately 500 hours. The average analysis for the oily product obtained from the process was 53.7 per cent by weight of unreacted ar-ethyltoluenes and 38.7 per cent of ar-methylstyrenes. The yield of ar-methylstyrenes was 38.1 per cent of theoretical, based on the ar-ethyltoluenes fed to the reaction, and 79.6 per cent, based on the ar-ethyltoluenes consumed.

*Example 2*

An arrangement of apparatus similar to that illustrated in Fig. 2 of the drawing was used in carrying out the following experiments. In the first experiment a reaction chamber, filled with the kind of catalyst employed in Example 1, was heated by flow of hot combustion gases from a gas burner, 6, over outer surfaces of the same. A vaporized mixture of m- and p-ethyltoluenes and superheated steam were passed, at rates of 42 pounds per hour and 115 pounds per hour, respectively, into admixture with one another to form a vapor mixture having a temperature of 598° C. and the mixture was passed through the externally heated reaction chamber 2. The effluent vapors were cooled to condense the aromatic products which were separated from the aqueous layer of the condensate and analyzed. The oily products contained 57.1 per cent by weight of unreacted ar-ethyltoluenes and 39 per cent of a mixture of m- and p-methylstyrenes. The yield of the methylstyrenes was 38.5 percent, based on the ar-ethyltoluenes fed to the reaction, and 86.2 per cent, based on the ar-ethyltoluenes consumed. The second experiment was carried out in the same manner, and with the same apparatus and catalyst as the first experiment, except that the rates of feed of ar-ethyltoluenes and steam were 42 and 125 pounds per hour respectively, and there was no external heating of the reaction chamber. During flow through the reaction chamber, the temperature of the vapors decreased from 640° to 620° C. The aromatic product contained 53.8 per cent by weight of unreacted ar-ethyltoluene and 36.9 per cent of a mixture of m- and p-methylstyrenes. The yield of the methylstyrenes was 36.4 per cent, based on the ar-ethyltoluenes fed to the reaction, and 76.2 per cent, based on the ar-ethyltoluenes consumed.

We claim:

1. A method for the production of ar-methylstyrenes which comprises feeding steam which is superheated to a temperature of at least 600° C. and ar-ethyltoluene rich in at least one of its meta- and para-isomers into admixture with one another to form a vapor mixture having a reaction temperature between 550° and 675° C. and approximating the optimum temperature for production of ar-methylstyrenes from the mixture, and passing the mixture through a reaction chamber while externally heating the chamber to supply heat in amount approximately equal to that consumed in the dehydrogenation reaction which occurs and such as to prevent a more than 15° C. change in temperature of the mixture during flow through the reaction zone.

2. A method, as claimed in claim 1, wherein the ar-ethyltoluene feed material is a mixture of m- and p-ethyltoluenes.

3. A method, as claimed in claim 2, wherein the reaction chamber is externally heated by passage of the superheated steam over outer surfaces of the same and the steam is then passed into admixture with the ar-ethyltoluene vapors to form the reaction mixture.

4. A method, as claimed in claim 2, wherein the dehydrogenation reaction is accomplished in contact with a dehydrogenation catalyst which is contained in the reaction zone.

5. A method, as claimed in claim 2, wherein the ar-ethyltoluene feed material is a mixture of meta- and para-ethyltoluenes, the dehydrogenation reaction is accomplished in contact with a dehydrogenation catalyst which is contained in the reaction zone, the vapors flowing from the reaction zone are cooled to condense the aromatic products, and the latter are fractionally distilled to separate therefrom a mixture of meta- and para-methylstyrenes.

References Cited in the file of this patent

UNITED STATES PATENTS

| Number | Name | Date |
| --- | --- | --- |
| 2,263,363 | Menshih | Nov. 18, 1941 |
| 2,370,797 | Kearby | Mar. 6, 1945 |
| 2,531,327 | Elwell | Nov. 21, 1950 |